INVENTORS
Paul B. Weisz
BY Robert D. Goodwin

Oswald G. Hayes
AGENT OR ATTORNEY

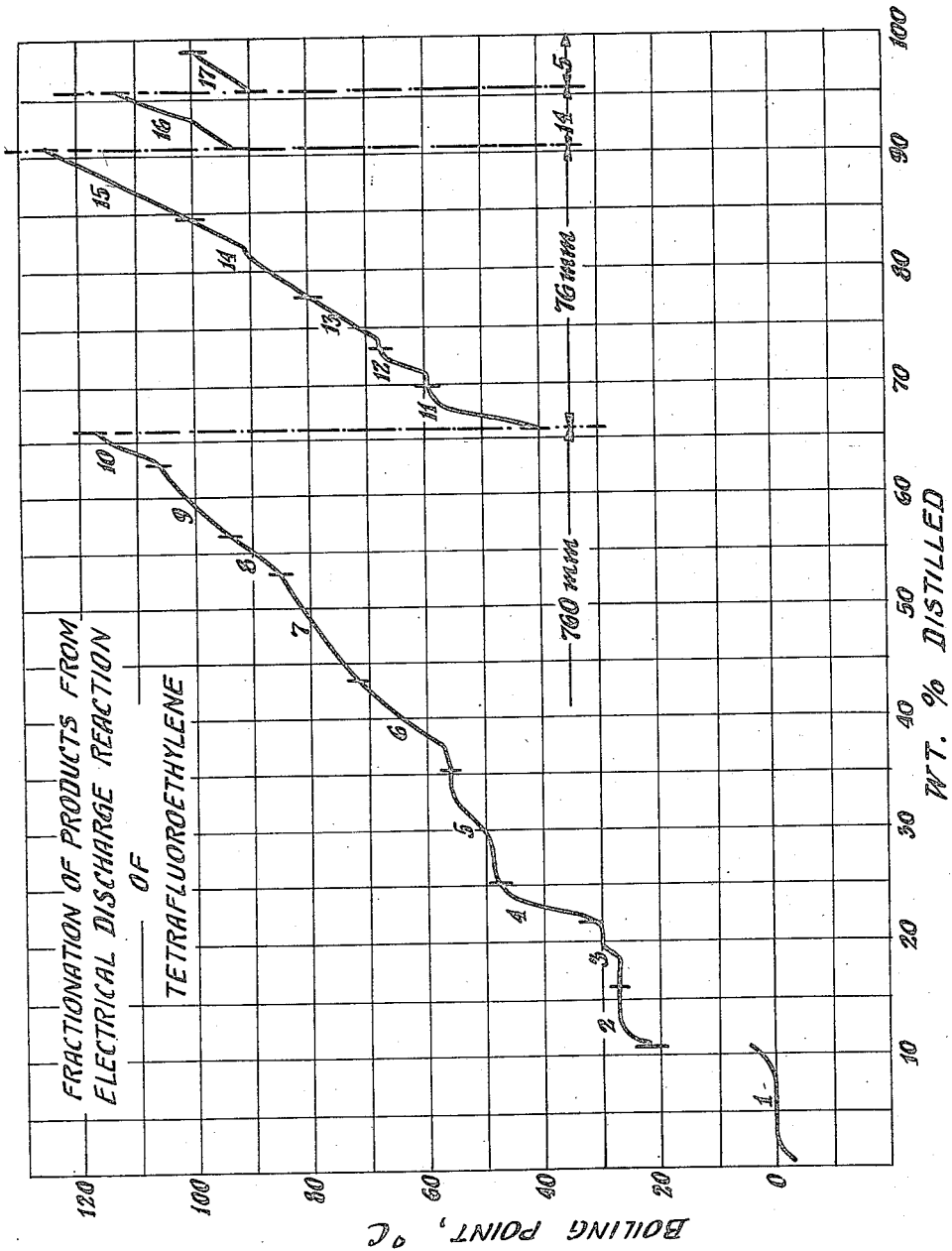

Patented Apr. 20, 1954

2,676,145

UNITED STATES PATENT OFFICE 2,676,145

GASEOUS POLYMERIZATION BY ELECTRICAL DISCHARGE

Paul B. Weisz, Pitman, and Robert D. Goodwin, Wenonah, N. J., assignors to Socony-Vacuum Oil Company, Incorporated, a corporation of New York Application September 1, 1949, Serial No. 113,512

4 Claims. (Cl. 204—169)

This invention relates to polymerization of tetrafluoro ethylene by subjecting it to an electrical gas discharge, and to new compositions of matter produced thereby, namely certain unsaturated, liquid perfluorocarbons within the range of more than four to ten or more carbon atoms per molecule.

The relatively recent develoments in manufacture and handling of fluorine and its organic derivatives have given rise to a new branch of chemistry dealing with the unusual compounds known as fluorocarbons wherein fluorine may be regarded as substituted for the hydrogen of hydrocarbons. Compounds of the type which are analogues of hydrocarbons having all the hydrogen atoms replaced by fluorine have been designated as "perfluoro" compounds. Thus, tetrafluoro ethylene may be referred to as perfluoro ethylene and octafluoro propane becomes perfluoro propane. This convenient language is used herein.

Most perfluoro compounds known to have been produced to this date have been synthesized by oxidative processes involving fluorine. The reactivity of fluorine or of its compounds employed in these processes is known to be high, such that the products of such reactions consist of saturated compounds, as any unsaturated link which might have formed quickly takes up another fluorine molecule and becomes saturated.

Attempts to synthesize unsaturated perfluorocarbons having a molecular weight high enough to result in compounds other than gases have proven unexpectedly difficult. The unique behavior of the fluorocarbon compounds has necessitated development of special techniques of synthesis for individual compounds.

Consequently, very few olefinic perfluorocarbons are known to have been successfully prepared and properly identified. Moreover, these are of low molecular weight so as to be gaseous at normal temperature and pressure. In a few cases they are liquids, but have cyclic structure, namely perfluoro cyclopentene and perfluoro cyclohexadiene. The dimers of perfluoro butadiene described by Miller, I. and E. Chem. 39, 401 are also cyclic in nature as shown in Atomic Energy Commission Document MDDC-432.

The only olefinic perfluorocarbon known to have been produced on a scale other than in the laboratory is the gas, perfluoro ethylene, from which is also derived the now well known solid polymer known under the trade name "Teflon."

It appears that polymerization of perfluoro ethylene to high molecular weight solid polymers is relatively easy of accomplishment, but control of a reaction to yield liquid products of correspondingly lower molecular weight has presented difficulties that have not been solved prior to the present invention.

According to the process of this invention, gaseous perfluoro ethylene is subjected to an electrical gas discharge, resulting in formation of a series of compounds ranging from gaseous through the liquid boiling range to solid reaction products and characterized by a considerable degree of unsaturation. A large number of products are obtained simultaneously. While the relative quantities of the different possible products will vary with the conditions of reaction including temperature, pressure, current density, etc., it is a characteristic of the process that the products are unsaturated compounds having, on a statistical average, not less than one carbon-carbon double bond per molecule of product.

The electrical discharge is of the type normally referred to as "cold" discharge as contrasted with electric arcs. It has been found that the character of the electrical discharge may be varied considerably in the present process with the production of liquid compounds, although the molecular weight distribution and absolute product yield may be shifted somewhat. The temperature of the gas under treatment should be less than 1000° C., usually below 500° C. Such temperature control will take into account a number of variables such as gas pressure, efficiency of artificial cooling, and the rate of the electrical energy input to the system.

It is well known that in any ordinary discharge, and regardless of the mode of excitation, whether by direct or alternating potentials or by electrodeless high-frequency fields, the gas temperature increases quite rapidly with increase of gas pressure in the discharge. Suitable pressures are largely determined, therefore, by conditions necessary to maintain desirably low reaction temperatures. It has been found that, regardless of the mode of excitation of the discharge, chemical conversion can be attained in ordinary A. C. or D. C. discharges in perfluoro ethylene at gas pressures from near vacuum to as high as about 10 cm. Hg.

If, however, an electrical discharge is to take place at high operating pressure without increasing the gas temperature, special design features have to be provided, which are characterized by providing a low rate of supply of electrical energy. One such design is that of the so-called "ozonizer" in which a high-tension voltage is made to produce a corona discharge similar to the "static" discharges known to occur around electrodes having high curvatures, such as points or corners, or simply a conductor of small diameter such as a high-tension wire. This design results in a discharge of small current density, so that the rate of heat production is balanced by the rate of heat dissipation due to conduction, convection and radiation.

It is often preferable to provide forced circulation of a heat exchange fluid against the walls of the reactor. As pointed out hereinafter, water may be circulated through a jacket about the reactor for cooling.

The character and scope of the invention may be further discussed with reference to the annexed drawings, wherein.

Figure 4:
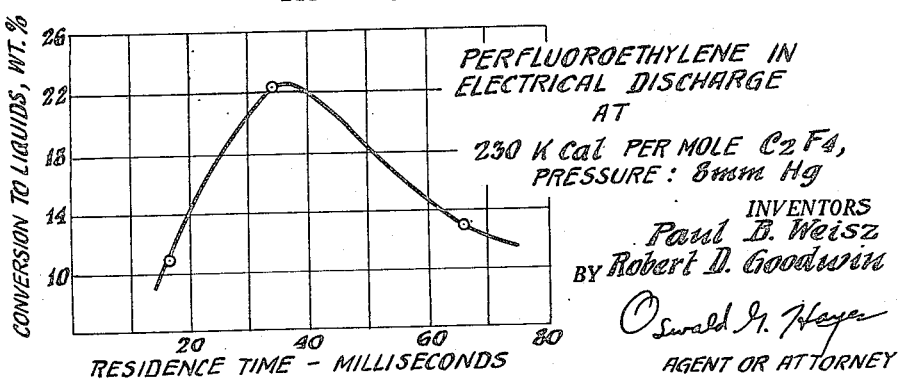

Figure 4 demonstrates the effect of residence time on yield in a typical reactor, and Figure 5 is the boiling point curve of a liquid product of the invention.

Figure 1:
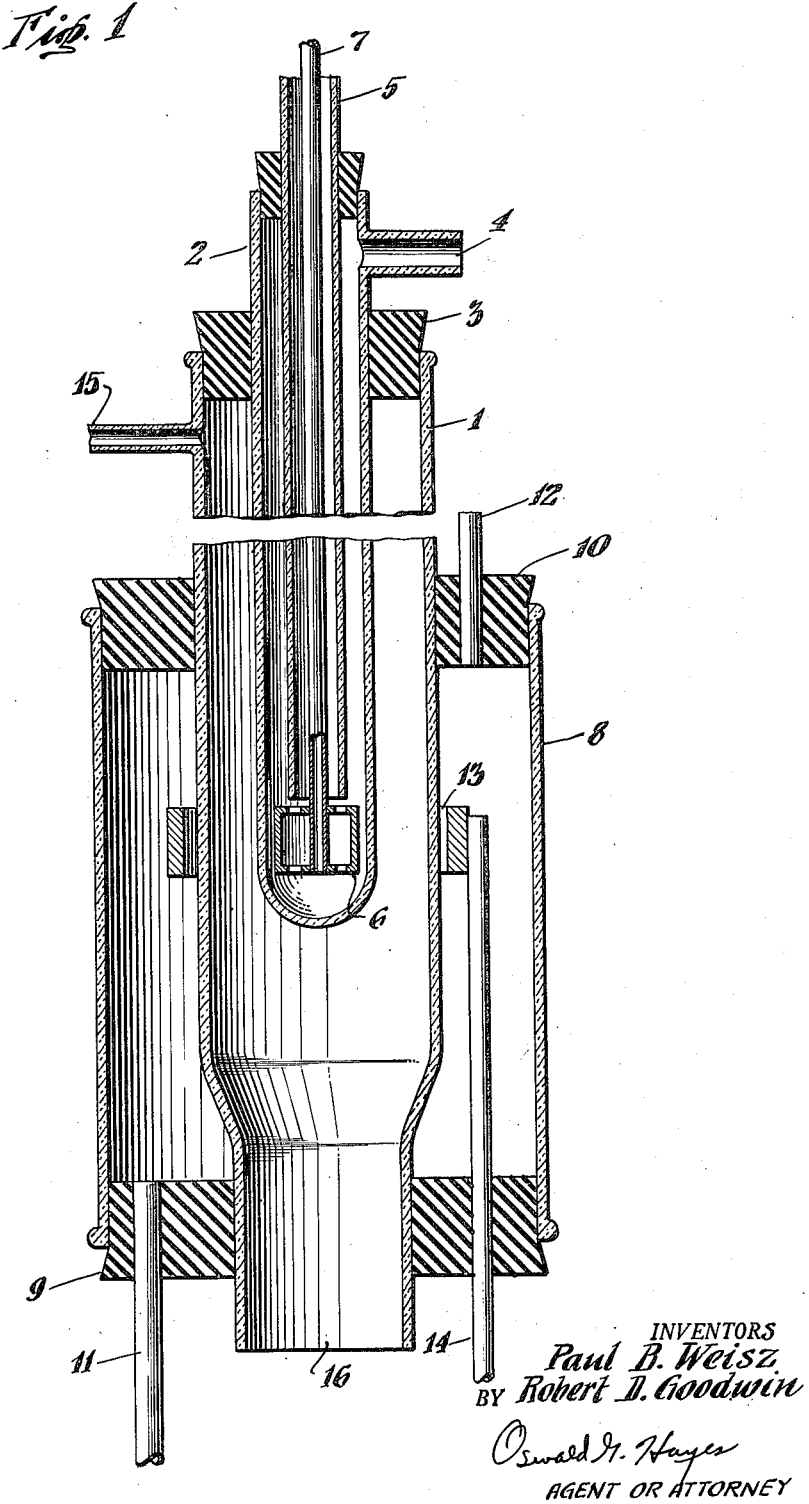
Figure 1 is a view in vertical section of a suitable reactor.

The process is aptly illustrated by a reaction conducted in apparatus illustrated in Figure 1 of the annexed drawings. A reaction space is defined between a reactor tube 1 of heat resistant glass known as "Vycor" and a thimble tube 2 of similar material secured in the reaction tube by a rubber stopper 3. The thimble tube 2 includes a side-arm 4 and an inner tube 5 for circulation of a cooling medium through the thimble tube 2. A cylindrical brass electrode 6 is suspended by a lead 7 in the lower part of thimble tube 2. The electrode 6 is drilled as shown to permit circulation of the cooling medium therethrough.

A jacket 8 surrounds the reaction tube and is positioned with respect thereto by rubber stoppers 9 and 10 having tubes 11 and 12 passed therethrough for circulation of a cooling medium if required. A brass collar electrode 13 is supported in position about the reaction tube 1 by a lead 14. Reactant is admitted to the reaction space between tubes by side-arm 15 and products of the reaction are withdrawn through neck 16.

EXAMPLE 1

In a typical run, tap water was circulated through the outer jacket from tube 11 to tube 12 and thence through the thimble tube from side-arm 5 to discharge through tube 4. The reaction space was defined between a reaction tube of 25 mm. outside diameter having a wall thickness of 1 mm., and a thimble tube of 12 mm. outside diameter. Perfluoro ethylene was passed through inlet 15 at the rate of 120 cubic centimeters per minute of gas measured at normal pressure and temperature. Leads 7 and 14 were connected to a source of current having a frequency of 14 megacycles per second. Heat dissipation in the resultant discharge was equal to 75 watts.

A convenient measure for the characterization of the energy consumption in the gas discharge reaction is obtained by calculating the amount of electrical energy supplied to the reactor per mole volume of reactant passing through said reactor. It is convenient to convert electrical energy units into chemical units, that is kilocalories, to conform with the usual concept of energy consumption in a chemical system. Accordingly, this figure in kcal./g. mole gas introduced is obtained by using the formula $$\text{kcal./mole} = 360 \times \frac{\text{Electrical power in watts}}{\text{Gas flow in std. cc/min.}}$$

In the above example the energy supply corresponds to about 225 kilocalories per gram mole of perfluoro ethylene. Liquid product was obtained with a conversion factor of about 22 per cent by weight on gas charged per single pass through this reactor.

As has been mentioned above, considerable variation in operating characteristics is allowable. Liquid perfluoro olefin compounds have been obtained by the use of discharges with and without electrodes, with direct current and alternating currents, as long as conditions concerning the temperature of the reactant gas were met. A number of such examples obtained with different reactors and discharge types are described below.

EXAMPLE 2

Perfluoro ethylene was reacted under a pressure of 1.2 mm. Hg at a flow rate of 50 cc. per minute measured at normal pressure and temperature through an electrodeless glow discharge at a radio frequency of 14 megacycles per second. Power input was 55 watts to 850 cc. of reaction space or 400 kcal. per mole. A conversion of 45 per cent by weight to liquid products was obtained.

EXAMPLE 3

A further portion of tetrafluoro ethylene was reacted under conditions similar to those of Example 2, except that the pressure was reduced to 1 mm. Hg and the flow rate was 15 cc. per minute at a power input of 100 watts or 2400 kcal. per mole of reactant. Under these conditions 38 per cent conversion to liquid product was found.

EXAMPLE 4

In this instance power was supplied at 12 megacycles per second by carbon electrodes to give a glow discharge at 55 watts. The pressure was 1 mm. Hg. The reaction space was 200 cc. Flow rate was 50 cc. per minute N. T. P. The energy input was therefore 400 kcal. per mole, giving a conversion of 19 per cent liquid product.

EXAMPLE 5

Utilizing a glow discharge from carbon electrodes with a 60 cycle alternating current at 90 watts in a reaction space of 1000 cc., tetrafluoro ethylene was reacted at 2.5 mm. Hg and a flow rate of 176 cc. per minute. The energy input was 185 kcal. per mole, resulting in 15 per cent of normal liquid product.

EXAMPLE 6

A glow discharge was produced from copper electrodes by a 60 cycle alternating current at 67 watts. Tetrafluoro ethylene at 0.9 mm. Hg was passed through the discharge space of 1000 cc. at the rate of 54 cc. per minute. Reactant receiving 450 kcal. per mole of energy was converted to give 26 per cent by weight of liquid product.

EXAMPLE 7

A glow discharge from carbon electrodes energized by direct current at less than 20 watts was utilized to react 200 cc. of tetrafluoro ethylene at 0.5 mm. Hg over a period of 4 minutes. This energy input of less than 145 kcal. per mole gave a normal liquid conversion of 6.5 per cent by weight.

EXAMPLE 8

A typical ozonizer excited by 60 cycle alternating current was used to react 1.2 liters of tetrafluoro ethylene at 1 atmosphere pressure under electrode voltage of 22,000 volts. The reactant was static in the equipment for a period of 6 hours, producing 0.5 gram of normal liquid product.

EXAMPLE 9

The reactor shown in the drawing was used to react tetrafluoro ethylene at 8 mm. pressure with an energy input of 300 kcal. per mole supplied as a current at a frequency of 14 megacycles per second. The flow rate was 120 cc. per minute of reactant. The effluent gaseous products were found to contain:

| | Mole percent |
|---|---|
| $C_2F_4$ and $C_2F_6$ | 56.5 |
| $C_3F_8$ | 17.6 |
| $C_3F_6$ | 14.6 |
| $C_4F_8$ | 7.7 |
| Others | 3.6 |
| | 100.0 |

EXAMPLE 10

A total of 2100 cc. of tetrafluoro ethylene was passed through an electrodeless reactor energized by a current of 12 megacycles per second at 70 watts. Energy input was 322 kcal. per mole under a pressure of 40 mm. Hg. The rate of flow was 70 cc. per minute. The gaseous products were:

| | |
|---|---|
| $C_2F_4$ | 7.4 |
| $C_2F_6$ | 61.7 |
| $C_3F_6$ | 30.9 |
| | 100.0 |

EXAMPLE 11

Using the electrodeless reactor at 1 mm. Hg pressure with the energy input at 400 kcal. per mole supplied as current at 12 megacycles per second, three runs were made at a flow rate of 60 cc. per minute using tetrafluoro ethylene in the first run (a) and the product from the previous run in each of the other two experiments (b) and (c). The results are shown tabulated below:

| | Charge | Weight of Charge (grams) | Weight of Liquid Product (grams) | Conversion, Percent |
|---|---|---|---|---|
| a | $C_2F_4$ | 48 | 3.5 | 7.3 |
| b | Gas products from (a) | 28 | 3.3 | 11.8 |
| c | Gas products from (b) | 22.8 | 1.6 | 7.0 |

EXAMPLE 12

An all-Pyrex concentric gas discharge vessel of thimble-tube length 335 mm. and diameter 35 mm. within outer tube of 90 mm. diameter and wall-thickness 1.5 mm. (Figure 1) was employed for the treatment of gaseous discharge products by recycling and admixed with fresh perfluoroethylene as required to maintain the gas supply. The gas-flow was 360 cc. per minute N. T. P. through the reaction space of 850 cc. under pressure of 1.3 mm. Hg and an R. F. power input of 210 watts such that the energy supply was 210 kcal. per mole. Under these conditions 3450 grams of crude liquid product was produced at a rate of 20 to 25 grams an hour and a measured absolute material yield of 77 per cent. Simple distillation of the crude liquid product to a temperature of 160° C. under 5 mm. Hg pressure effected:

| | Per cent |
|---|---|
| Gases | 3 |
| Liquid distillate | 92 |
| Residue | 5 |

Subsequent fractionation of this liquid distillate produced the rectification curve of Figure 5.

The conversions obtainable have been studied as a function of the various operating variables. In Examples 2 to 8 are presented information to show that many variations of the general discharge design are possible in principle. As was pointed out further above, however, the successful designs are distinctly characterized by the fact that all variables must cooperate in achieving a cold discharge in contrast to those discharges commonly referred to as arcs, the latter causing gas temperatures of in excess of about 1000° C. to be produced. Naturally, within the wider ranges of variables allowable for successful operation of the process there are, depending somewhat on reactor design, certain preferred operating ranges yielding near optimum conversions.

Figure 2:
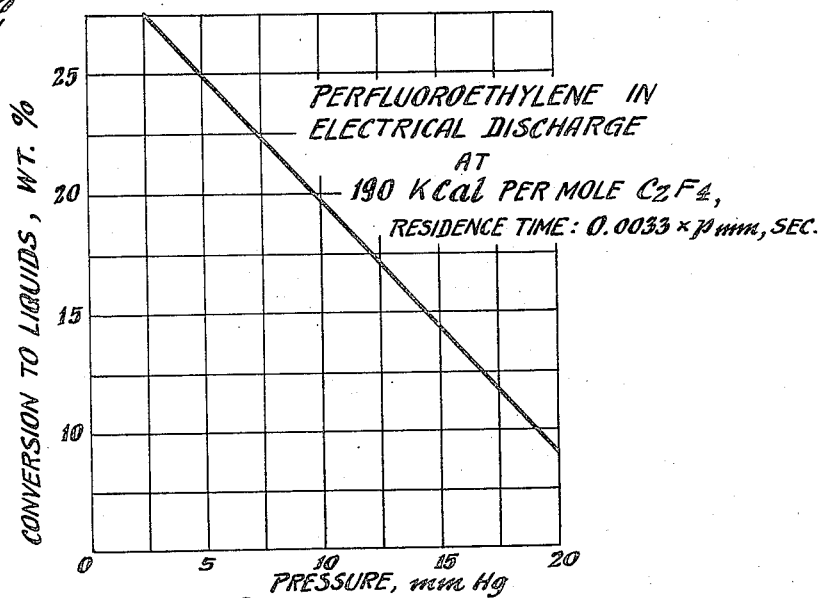
Figure 2 is a graphical representation of variation in yield with pressure.

For example, it has been found that the conversion generally increases with lower gas pressures. In Figure 2 is plotted conversion for liquid products versus gas pressure as it was obtained with the reactor system described above as a typical design. The rapid decrease in conversion with increasing pressures is apparent. Above 10 to 15 cm. pressure essentially no liquid products could be obtained.

Figure 3:
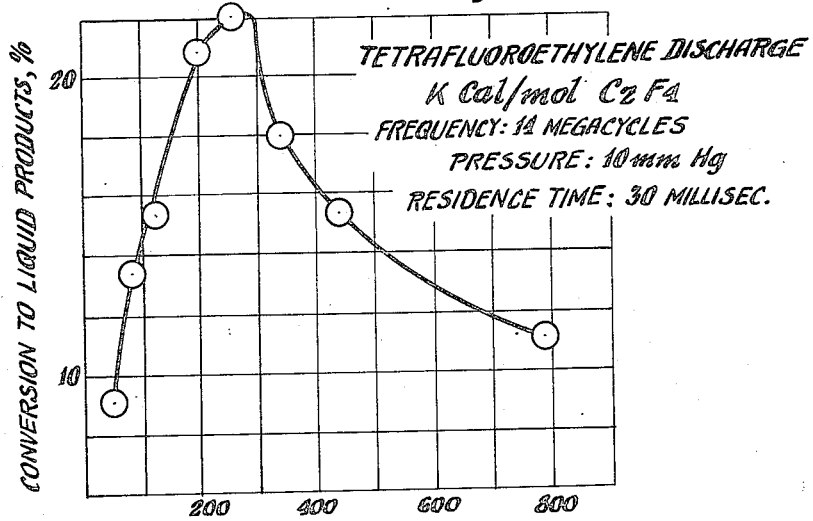
Figure 3 shows a typical relationship of yield to rate of energy supply.

In Figure 3 is shown the liquid conversion percentage versus the rate of energy supplied per mole of reactant gas passing through the reactor. Clearly, there is an optimum condition for a given reactor design, while substantially no yield is obtained at energy levels of much below 10 kcal. per mole.

It is found, however, that useful conversions without appreciable decomposition are obtained under suitable conditions for very high values of energy supply. Thus at energies up to 2400 kcal. per mole in a flow system providing long times of residence, we have obtained conversions of about 35 to 45 per cent per pass, as can be seen in Example 3.

In Figure 4 is shown an example of liquid conversion dependence upon time of residence of the gas in the reaction space. Clearly there is an optimum condition, dependent upon reactor geometry and other conditions of pressure and energy supply.

The above description has been concerned largely with the production and characterization of liquid perfluorocarbons. As has been mentioned, conditions can be attained at which the products are largely gaseous or largely oils, greases or solids.

The gaseous products obtainable in the gas discharge treatment of perfluoro ethylene include large proportions of perfluoro ethane and perfluoro propene, perfluoro propane and perfluoro butene. Such conversion to gaseous products is favored by high electrical energy per mole quantity of reactant as well as by higher pressure, both of which contribute to elevating the gas temperature in the reaction.

The gaseous by-products and the vapors boiling above the products liquid at room temperature obtained by distillation can be used as charging gas alone with similar or even higher conversion to normally liquid products.

It should be noted that the conversion using by-product gases as charging material is comparable and may be greater than when using pure $C_2F_4$. It is obvious, therefore, that it is not an essential part of this invention that the charging material be pure perfluoro ethylene, but that it may equally well be a mixture of perfluoro ethylene and other perfluorocarbons such as those mentioned above as by-products. The use of pure perfluoro olefins other than $C_2F_4$ as a starting material such as, for example, perfluoro propene, also leads to liquid products falling within the scope of this invention.

The products obtained by electrical discharge treatment range from gaseous products such as perfluoro propene through liquids of a considerable molecular weight range, to solids. The distribution in molecular weights can be influenced somewhat by the choice of operating pressures. It was found, for example, that a large fraction of perfluoro proplyene and butylene is obtained at higher pressures and that a large fraction of the products could be made to have grease-like consistency by operating at pressures lower than 1 mm. Hg. Figure 5 reproduces a portion of a distillation curve of a typical batch of produce obtained with a reactor as above illustrated by Figure 1.

The value of this invention lies not only in providing a method for synthesizing liquid range perfluorocarbons without the use of elementary fluorine, but also in the specific and novel nature of the products thus obtained, for investigation of the liquid products has shown that they are unsaturated to an extent corresponding to not less than one carbon-carbon double bond per molecule of product. Because of this fact it is obvious that these products are valuable intermediates for the synthesis of a great variety of new compounds and derivatives such as lubricants, dyes, plastics and the like.

We have measured the density and refractive index of the crude liquid products of a typical run and found $$d = 1.68 \text{ to } 1.76$$
$$n_D = 1.32 \text{ to } 1.33$$

When the densities of known compounds are plotted versus carbon number, it is found that regardless of structure an estimate can be had of the average carbon number of the material obtained, which is approximately seven carbon atoms per molecule.

It is useful to apply the concept of the molar refraction which is determined by the structure of the molecule as $$M. R. = 2.418 \, N_C + 1.245 \, N_F + 1.733 \, N_D$$

where $N_C$ is the number of C-atoms, $N_F$ the number of F-atoms, and $N_D$ the number of double bonds per molecule. Since this number can be experimentally determined by measuring the density and the refractive index, conclusions can be drawn with respect to the number of unsaturated bonds which may be present. On tabulating the values of $$\frac{M. R.}{M}$$

for various structures having seven carbon atoms, which would represent the average molecule of the present products, such figures of $$\frac{M. R.}{M}$$

can be compared with the experimental figure obtained from $$\frac{1}{d} \frac{n^2-1}{n^2+2}$$

Thus the numbers shown in Table I are obtained.

TABLE I

*Experimental*

$$\frac{1}{d} \frac{n^2-1}{n^2+2} = 0.117$$

| Assumed Molecule | $\frac{M. R.}{M}$ |
|---|---|
| n-$C_7F_{16}$ | .095 |
| cyclo-$C_7F_{14}$ | .098 |
| $C_7F_{14}$ | .103 |
| cyclo-$C_7F_{12}$ | .108 |
| $C_7F_{12}$ | .113 |

While this calculation involves a hypothetical "average" molecule and there is no precise meaning to this concept, within the approximate validity of such a calculation it becomes clear that the products dealt with must have in excess of one double bond per molecule as a statistical average.

A further check of this assumption was obtained by an analysis of the carbon content of the product which was 29.6% by weight as compared to a theoretical figure of 21.6% for a composition of $C_7F_{16}$ or 26.9% for $C_7F_{12}$.

Individual cuts from the fractionation represented by Figure 5 have been characterized as to some of the components contained therein. They are new compositions of matter not heretofore produced and identified.

The identification of these compounds was accomplished by determining experimentally the boiling points, molecular weights, the quantity $$\left( \frac{1}{d} \frac{n^2-1}{n^2+2} \right)$$

(involving the density $d$ and the refractive index $n$), the carbon-fluorine elemental analysis, oxidation by $KMnO_4$ and by subsequently comparing these figures with known, extrapolated or theoretical values for each structural possibility. These data are collected and exhibited in Table II. In each group of compounds and their accompanying constants, that line or those lines which are underscored are considered to be of greatest importance as corresponding most nearly to the known values for a corresponding structure.

From the known perfluorocarbons it can be seen that their approximate boiling points are largely determined by the number of carbon-atoms per molecule, regardless of specific molecular structure or degree of unsaturation, with the exception of aromatic compositions. Thus it is possible to ascertain at least the carbon number of an unknown perfluorocarbon cut provided that there is independent evidence as to whether or not it is aromatic. This enables one to restrict the comparison of measured constants with those to be expected by hypothetical structure, in each case, to only a limited number of possibilities. This is the method by which, in Table II, specific structures have been selected for comparison. It becomes evident from the data collected for the $C_5$-fraction that the acyclic perfluoro olefin $C_5F_{10}$ is the only substance which could satisfy all physical and chemical properties as measured.

Incidentally, the product obtained from bromination of this $C_5F_{10}$ with ultraviolet light contained 37.9% Br, to be compared with 39.0% for $C_4F_{10}Br_2$. The heat of vaporization of the $C_5F_{10}$ was 6.55 kcal. per mole.

For the $C_6$-fraction, the data lead to the conclusion that the predominating compound must be the acyclic perfluoro olefin $C_6F_{12}$.

For the $C_7$-fraction it is found that the composition produced can only be described by the formula $C_7F_{12}$.

For the $C_8$-fraction, the composition produced can only be described by the formula $C_8F_{12}$. Furthermore, its structure must correspond to the acyclic olefin $C_8F_{12}$, rather than the cyclic mono-olefin $C_8F_{12}$. This follows from the fact that the composition has a refractive index between 1.304 and 1.315 which is not larger than that of the cyclic homologue $C_6F_8$ known to be equal to 1.315. Certainly, a homologue having two additional carbon atoms would have to exhibit a distinctly greater refractive index.

For the $C_9$-fraction, the composition produced can only be defined by the formula $C_9F_{14}$.

of substantially less than 15 cm. Hg, and effecting electrical energy input of substantially more than that corresponding to 10 kcal. per mole of perfluoro ethylene.

3. The process of claim 1, further characterized by a charging stock comprising a mixture of perfluorocarbons, of which not less than 5% is perfluoro ethylene.

4. The process for converting perfluoro ethylene to perfluorocarbons of greater carbon content which comprises subjecting gaseous perfluoro ethylene to the action of a corona discharge characterized by an energy dissipation of substantially less than 200 watts per liter of reactor volume, a gas pressure in excess of 15 cm. Hg, and an electrical energy input corresponding to substantially more than 10 kcal. per mole of perfluoro ethylene.

TABLE II

*For characterization of perfluorocarbons from $C_2F_4$ electrical discharge*

| Substance | B. P., °C. | M. W. | $d_4^{20}$ | $n_D^{20}$ | $\frac{1}{d}\frac{n^2-1}{n^2+2}=R_D/M$ | Percent C | Percent F | g. KMnO$_4$ per g. Substance |
|---|---|---|---|---|---|---|---|---|
| Exp | 25–30 | 254 | 1.494 | 1.256 | 0.108 | | 73.6; 75.4 | 0.75 |
| n-C$_5$F$_{12}$ | 29.3 | 288 | 1.624 | 1.239 | 0.093 | | 79.2 | |
| i-C$_5$F$_{12}$ | 30.1 | 288 | 1.663 | 1.245 | 0.093 | | 79.2 | |
| cy-C$_5$F$_{10}$ | 22.5 | 250 | 1.647 | 1.256 | 0.098 | | 76.0 | |
| C$_5$F$_{10}$ | | 250 | | | 0.105 | | 76.0 | 0.42 |
| cy-C$_5$F$_8$ | 34 | 212 | | | 0.112 | | 71.7 | 0.50 |
| Exp | 55–61 | 297–315 | 1.558 | 1.267 | 0.108 | | 73.9; 74.5 | 0.32 |
| Exp | 62–75 | 301–312 | 1.58 | 1.29 | 0.114 | 26.0 | | |
| n-C$_6$F$_{14}$ | ᵃ55 | 338 | ᵃ1.67 | ᵃ1.256 | 0.095 | 21.3 | 78.7 | |
| cy-C$_6$F$_{12}$ | ᵃ50 | 300 | ᵃ1.74 | ᵃ1.276 | 0.098 | 24.0 | 76.0 | |
| C$_6$F$_{12}$ | ᵃ58 | 300 | | | 0.104 | 24.0 | 76.0 | 0.35 |
| cy-C$_6$F$_{10}$ | ᵃ60 | 262 | | | 0.109 | 27.5 | 72.5 | 0.40 |
| C$_6$F$_{10}$ | ᵃ60 | 262 | | | 0.116 | 27.5 | 72.5 | 0.80 |
| cy-C$_6$F$_8$ | 57 | 224 | 1.61 | 1.315 | 0.124 | 32.1 | 67.9 | 0.94 |
| Exp | 76–86 | 326 | 1.595 | 1.287 | 0.112 | ᵇ26.07 | ᶜ73.67 | 0.44 |
| n-C$_7$F$_{16}$ | 82.5 | 388 | 1.733 | 1.262 | 0.095 | 21.6 | 78.4 | |
| cy-C$_7$F$_{14}$ | 76.3 | 350 | 1.799 | 1.282 | 0.098 | 24.0 | 76.0 | |
| C$_7$F$_{14}$ | ᵃ84 | 350 | | | 0.103 | 24.0 | 76.0 | 0.30 |
| cy-C$_7$F$_{12}$ | ᵃ82 | 312 | | | 0.108 | 26.9 | 73.1 | 0.34 |
| C$_7$F$_{12}$ | ᵃ85 | 312 | | | 0.113 | 26.9 | 73.1 | 0.67 |
| cy-C$_6$F$_6$ | 82 | 186 | 1.62 | 1.376 | 0.146 | 38.6 | 61.4 | |
| Exp | 86–99 | 326 | 1.61 | 1.304 | 0.117 | | 75.0; 76.4 | 0.56 |
| Exp | 99–130 | 334 | 1.66 | 1.315 | 0.118 | ᵇ28.3 | ᵇ71.70 | |
| C$_8$F$_{18}$ | 104 | 438 | 1.83 | 1.278 | 0.095 | 21.9 | 78.1 | |
| cy-C$_8$F$_{16}$ | 102 | 400 | 1.85 | 1.290 | 0.098 | 24.0 | 76.0 | |
| C$_8$F$_{16}$ | | 400 | | | 0.102 | 24.0 | 76.0 | 0.26 |
| cy-C$_8$F$_{14}$ | | 362 | | | 0.106 | 26.5 | 73.5 | 0.29 |
| C$_8$F$_{14}$ | | 362 | | | 0.111 | 26.5 | 73.5 | 0.58 |
| cy-C$_8$F$_{12}$ | | 324 | | | 0.116 | 29.6 | 70.4 | 0.65 |
| C$_8$F$_{12}$ | | 324 | | | 0.122 | 29.6 | 70.4 | 0.97 |
| cy-C$_7$F$_8$ | 104 | 236 | 1.67 | 1.366 | 0.135 | 35.6 | 64.4 | |
| Exp | 114–125 | 386 | 1.680 | 1.329 | 1.120 | 29.55 | | |
| C$_9$F$_{20}$ | ᵃ130 | 488 | ᵃ1.82 | | 0.095 | 22.1 | | |
| cy-C$_9$F$_{18}$ | 123 | 450 | 1.891 | 1.297 | 0.097 | 24.0 | | |
| C$_9$F$_{18}$ | | 450 | | | 0.097 | 24.0 | | |
| cy-C$_9$F$_{16}$ | | 412 | | | 0.100 | 26.2 | | |
| C$_9$F$_{16}$ | | 412 | | | 0.104 | 26.2 | | |
| cy-C$_9$F$_{14}$ | | 374 | | | 0.108 | 28.9 | | |
| C$_9$F$_{14}$ | | 374 | | | 0.112 | 28.9 | | |
| cy-C$_9$F$_{12}$ | | 336 | | | 0.118 | 32.1 | | |

ᵃ By extrapolation.
ᵇ Avg. of 3 analyses.
ᶜ Avg. of 4 analysis.

We claim:

1. The process for converting perfluoro ethylene to perfluorocarbons of greater carbon content which comprises subjecting gaseous perfluoro ethylene to the action of an electrical discharge characterized by a gas temperature substantially lower than 1000° C.

2. The process for converting perfluoro ethylene to perfluorocarbons of greater carbon content which comprises subjecting gaseous perfluoro ethylene to the action of an electrical discharge characterized by a gas temperature substantially lower than 1000° C. at a gas pressure

References Cited in the file of this patent

UNITED STATES PATENTS

| Number | Name | Date |
|---|---|---|
| 1,710,155 | Egloff | Apr. 23, 1929 |
| 2,023,637 | Kleinschmidt | Dec. 10, 1935 |
| 2,257,177 | Luster | Sept. 30, 1941 |
| 2,393,967 | Brubaker | Feb. 5, 1946 |
| 2,495,407 | Chapman et al. | Jan. 24, 1950 |
| 2,500,218 | Towne et al. | Mar. 14, 1950 |

FOREIGN PATENTS

| Number | Country | Date |
|---|---|---|
| 130,608 | Great Britain | July 11, 1921 |